No. 664,978. Patented Jan. 1, 1901.
F. SPALDING.
MICROMETER GAGE.
(Application filed Apr. 20, 1899.)
(No Model.)

WITNESSES,
Ira L. Fish
R. A. Bates

INVENTOR,
Frank Spalding
BY Wilmarth H. Thurston
ATT'Y.

THE NORRIS PETERS CO., PHOTO-LITHO., WASHINGTON, D. C.

United States Patent Office.

FRANK SPALDING, OF PROVIDENCE, RHODE ISLAND, ASSIGNOR TO THE BROWN & SHARPE MANUFACTURING COMPANY, OF SAME PLACE.

MICROMETER-GAGE.

SPECIFICATION forming part of Letters Patent No. 664,978, dated January 1, 1901.

Application filed April 20, 1899. Serial No. 713,747. (No model.)

*To all whom it may concern:*

Be it known that I, FRANK SPALDING, of the city and county of Providence, in the State of Rhode Island, have invented certain new and useful Improvements in Micrometer-Gages; and I do hereby declare the following specification, taken in connection with the accompanying drawings, forming a part of the same, to be a full, clear, and exact description thereof.

The present invention relates to micrometer-gages, and more especially to the means for adjusting the gage so that the measurements will be accurately indicated by the scales and so that the scales may be adjusted to compensate for any wear in the parts.

The object of the invention is to provide a simple and efficient construction by which the micrometer-scale may be readily, conveniently, and accurately adjusted to bring it into proper position to accurately indicate the measurements, and this is accomplished by making the micrometer-sleeve in two parts or sections, one of which is rigidly secured to the spindle and the other of which is provided with a scale and is adjustably connected with the spindle, preferably through the other part.

Figure 2:
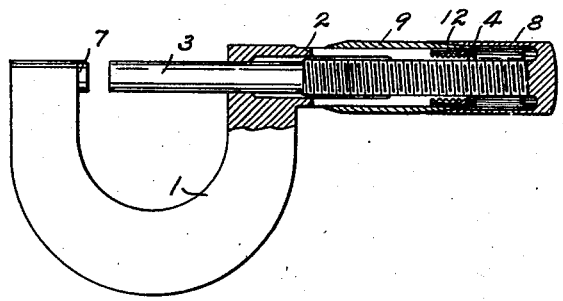
Figure 5:
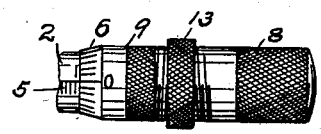
Figure 3:
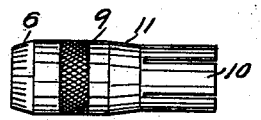
Figure 1:
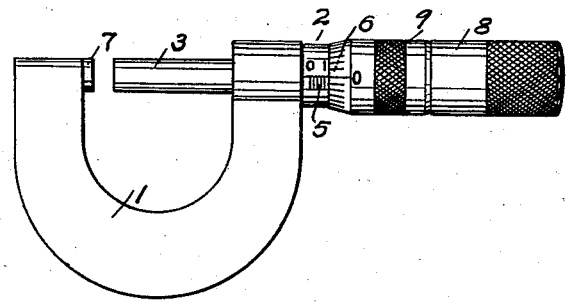
Figure 4:
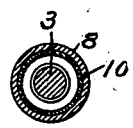

In the drawings, in which a micrometer-gage is shown embodying the present improvements in the preferred form, Figure 1 is a side elevation. Fig. 2 is a sectional view. Fig. 3 is a view of the adjustable part of the micrometer-sleeve detached. Fig. 4 is a cross-sectional view, and Fig. 5 is a partial elevation of a modification.

Referring to the drawings, the bow 1 and the barrel or nut 2 are of the usual construction, the barrel 2 having a split outer end provided with an internal screw-thread for engaging the screw-thread of the spindle 3. A tapered external screw-thread is formed at the outer end of the barrel 2, and is engaged by a nut 4, by which the end of the barrel may be contracted to cause the proper friction on the spindle-screw. The barrel 2 is provided with the usual graduated scale 5, consisting of a longitudinal line and a series of transverse lines, the space between the transverse lines corresponding to the axial movement of the spindle due to one complete rotation thereof. A micrometer-sleeve is secured to the spindle and surrounds the barrel 2, the edge of said sleeve being provided with a graduated scale 6, the zero-mark of which coincides with the longitudinal line of the scale 5 when the end of the spindle engages the anvil 7, secured in the end of the bow 1 opposite the barrel 2.

In order that the scale on the micrometer-sleeve may be adjusted to bring the zero-mark accurately into position should there be any wear between the end of the spindle and the anvil or should the proper relation of the two scales be disturbed in any way, the micrometer-sleeve is formed in two parts or sections 8 and 9, the section 8 being in fixed relation to the spindle, and the section 9, which carries the scale 6, being adjustably connected with the spindle. The section 8 may be secured to the spindle in any suitable manner, and, as shown, is secured thereto by being formed integral therewith. The section 9 is preferably connected with the spindle through the section 8, although such manner of connection is not essential. The sections 8 and 9 are preferably in the form of telescoping sleeves and are held in adjusted relation simply by the friction between the surfaces of said sections. It is also preferred to so proportion the diameters of the sleeves 8 and 9 that sleeve 9 will fit within the sleeve 8, although they may be so proportioned that sleeve 8 fits within the sleeve 9 without departing from the invention. The sleeve 9 is preferably split at the end which lies within the sleeve 8, thus forming spring-sections 10, which press outward against the inner surface of the sleeve 8 and produce an effective friction between the parts. It is also preferred to provide a slightly-tapered surface 11 on the sleeve 9, which engages a corresponding taper surface 12 in the sleeve 8. By forcing these surfaces together the friction between the sleeves 8 and 9 may be increased as desired. While both the spring-sections 10 and the tapered surfaces are preferably used, either or both may be omitted.

When it is desired to adjust the scale 6 with relation to the scale 5, it may be quickly and conveniently done by holding the sleeve 8 with one hand and turning the sleeve 9 in either direction with the other hand until the zero-mark on scale 6 registers with the longitudinal line on scale 5. After the adjustment is made the spindle is usually operated by the sleeve 8, although it may be operated by turning the sleeve 9, the friction between the sleeves being sufficient to turn the spindle up against the anvil with considerable force without causing a slipping between sleeves 8 and 9.

If desired, the sleeves 8 and 9 may be forced together after the proper adjustment is secured by means of a nut 13, Fig. 5, which engages left and right hand threads on the sleeves 9 and 8, respectively, although this construction is not necessary.

What I claim as my invention, and desire to secure by Letters Patent, is—

1. A micrometer-gage having a graduated barrel, a spindle, and a micrometer-sleeve formed in sections, one of said sections being fixed to the spindle and the other section being adjustably connected with said spindle, substantially as described.

2. A micrometer-gage having a graduated barrel, a spindle, and a micrometer-sleeve consisting of two sections adjustably secured together, one of said sections being secured to said spindle, and the other section being provided with a scale, substantially as described.

3. A micrometer-gage having a graduated barrel, a spindle, a sleeve fixed to said spindle and having a plain engaging surface, a second sleeve having a plain engaging surface, said sleeves being adjustably held together by the frictional engagement of said surfaces, and a scale on said second sleeve.

4. A micrometer-gage having a graduated barrel, a spindle, a sleeve fixed to said spindle, a second sleeve provided with spring-sections fitting within said fixed sleeve, and a scale on the outer end of said second sleeve, substantially as described.

5. A micrometer-gage having a graduated barrel, a spindle, a sleeve fixed to said spindle and having a tapered bearing-surface, a second sleeve having a tapered bearing-surface engaging the bearing-surface on the fixed sleeve, and a scale on the second sleeve.

6. A micrometer-gage having a graduated barrel, a spindle, a sleeve fixed to said spindle and having an internal tapered bearing-surface, a second sleeve fitting within said fixed sleeve and having an external tapered surface for engaging said internal tapered surface, and a scale on the outer end of said second sleeve, substantially as described.

7. A micrometer-gage having a graduated barrel, a spindle, a sleeve, fixed to said spindle, an internal tapered bearing-surface on said sleeve, a second sleeve provided with spring-sections fitting within said fixed sleeve, a tapered surface on said second sleeve for engaging said tapered surface in said fixed sleeve, and a scale on the outer end of said second sleeve, substantially as described.

8. A micrometer-gage having a graduated barrel, a spindle, a sleeve 8 fixed thereto, a sleeve 9 having one end split to form spring-sections 10, a tapered surface 11 on sleeve 9, a tapered surface 12 in sleeve 8, and a scale 6 on sleeve 9, substantially as described.

9. A micrometer-gage having a graduated barrel, a spindle, a sleeve fixed thereto, a tapered surface within said sleeve, a second sleeve, a tapered surface thereon for engaging the tapered surface within said fixed sleeve, a nut for forcing said sleeves together, and a scale on the outer end of said second sleeve, substantially as described.

FRANK SPALDING.

Witnesses:
IRA L. FISH,
R. A. BATES.